UNITED STATES PATENT OFFICE.

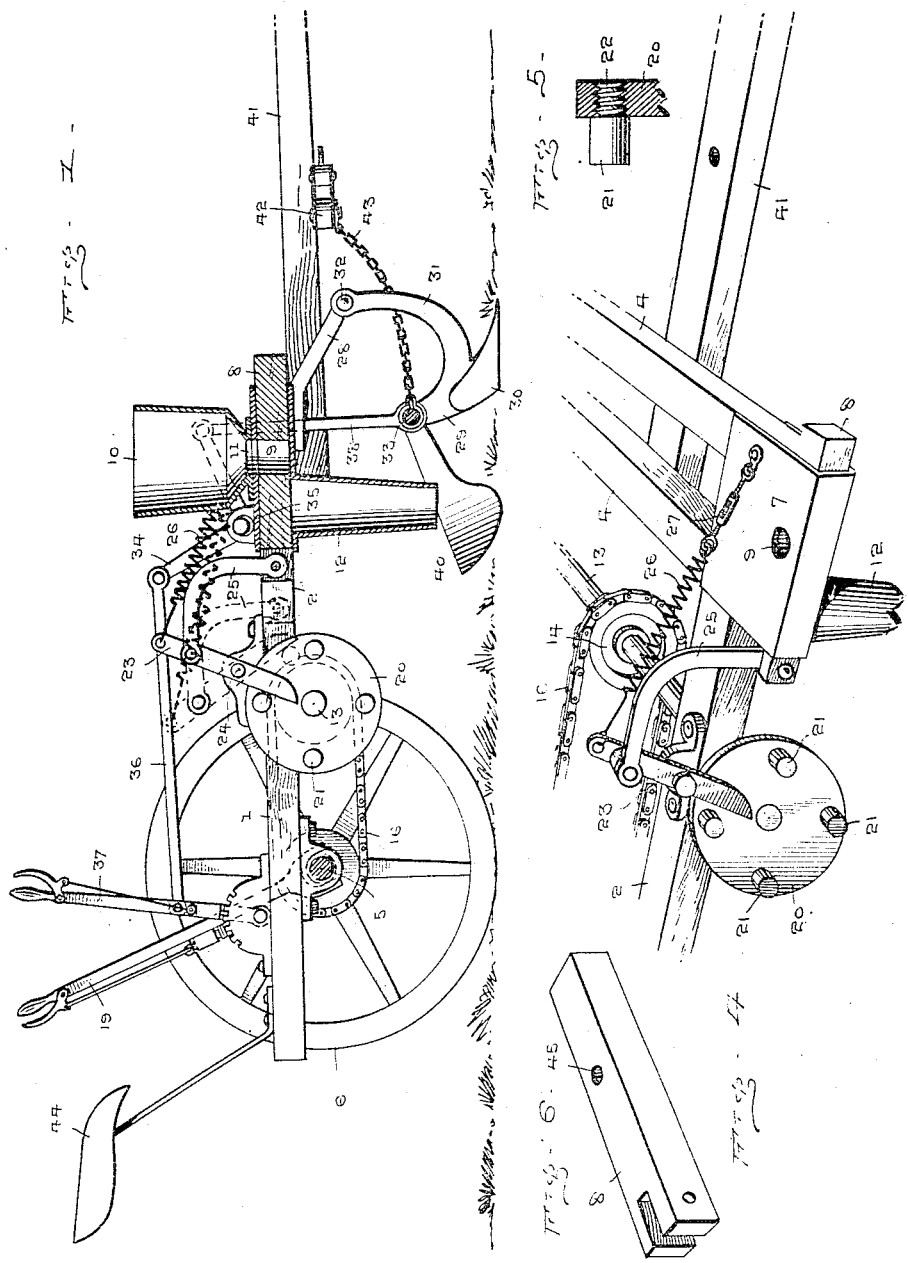

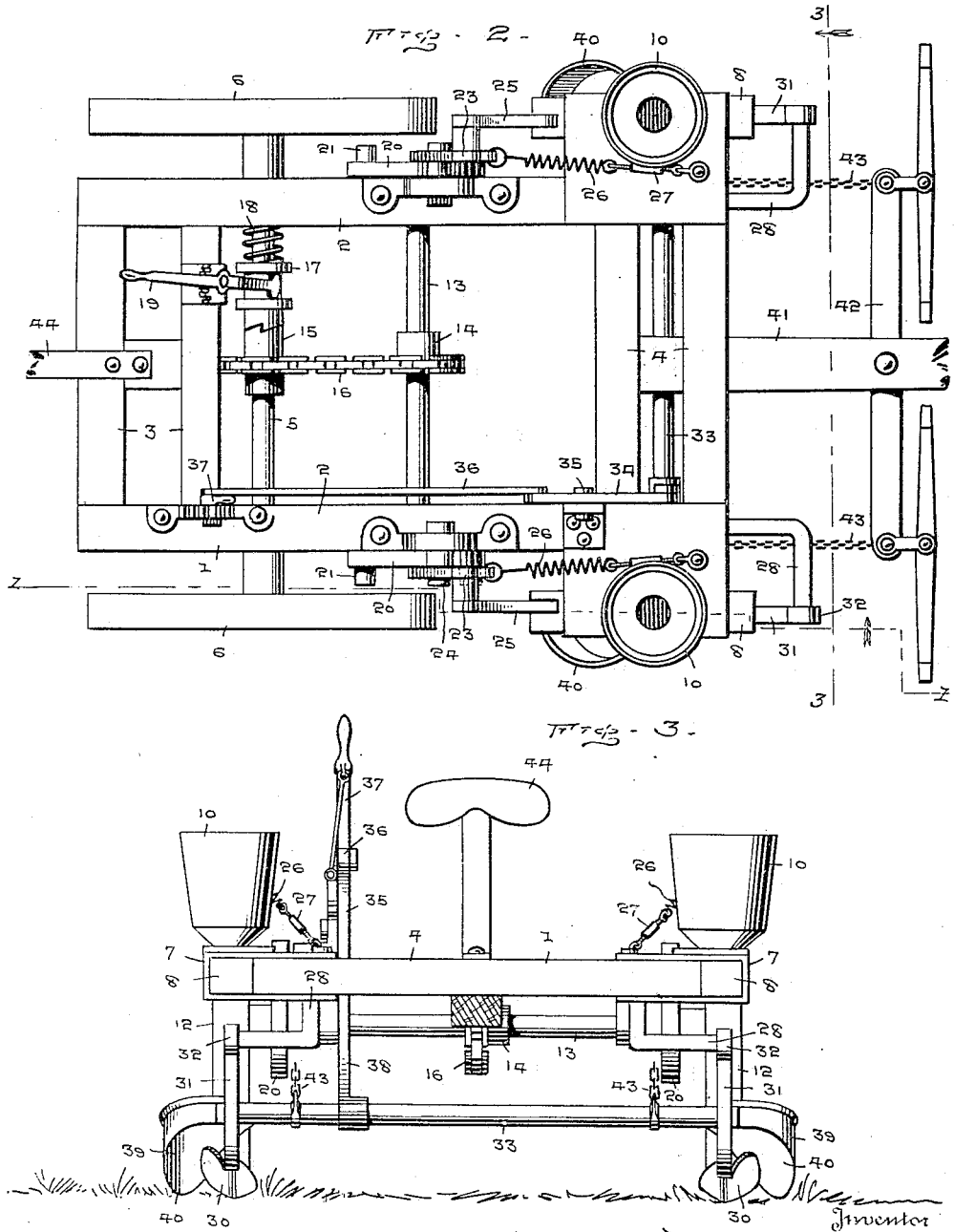

JOHN R. MULLIN, OF ROME, NEW YORK.

COMBINATION POTATO AND CORN PLANTER.

1,288,127.     Specification of Letters Patent.     Patented Dec. 17, 1918.

Application filed June 30, 1917. Serial No. 177,890.

*To all whom it may concern:*

Be it known that I, JOHN R. MULLIN, a citizen of the United States, residing at Rome, in the county of Oneida and State of New York, have invented certain new and useful Improvements in Combination Potato and Corn Planters; and I do hereby declare the following to be a full, clear, and exact description of the invention, such as will enable others skilled in the art to which it appertains to make and use the same.

This invention relates to new and useful improvements in a combined potato and corn planter and the principal object of the invention is to provide a planter of this character embodying feed hoppers below each of which is positioned a discharge pipe and out of vertical alinement with the hopper, a feed bar being slidably positioned between the hopper and the discharge pipe and operatively connected to the drive shaft of the planter so that the feed bar will be automatically actuated to successively convey the seed from the hopper to the discharge pipe.

Another object of the invention is to provide feed bars having different sized openings therein, whereby the planter may be used to plant either potatoes or corn.

A further object of the invention is to provide means for timing the actuation of the feed bars whereby the distance of each hill of seeds dropped within the furrow may be controlled at will.

A still further object of the invention is to provide the planter in advance of each discharge pipe with a furrow opener and a furrow coverer and means for adjusting said furrow opener with respect to the ground whereby the cutting depth of the furrow opener may be controlled.

With these and other objects as will appear as the description proceeds the invention comprises the various novel features of construction, combination and arrangement of parts as will be more fully described hereinafter and set forth with particularity in the appended claims.

Referring to the drawings:

Figure 1 is a vertical sectional view taken on the line 1—1 of Fig. 2.

Fig. 2 is a top plan view of the planter.

Fig. 3 is a transverse sectional view taken on the line 3—3 of Fig. 2.

Fig. 4 is a detail perspective view of one of the forward end corners of the main supporting frame showing the feed bar and the means for actuating it.

Fig. 5 is a fragmentary sectional view through one of the actuating disks showing how the studs are detachably connected thereto, and Fig. 6 is a detail perspective view of another feed bar having a smaller opening therein and which is used for planting corn.

Similar characters of reference are used to denote corresponding parts throughout the accompanying drawings, and the reference numeral 1 indicates the main supporting frame of the planter and consists of parallel side bars 2 which are connected at opposite end by pairs of cross bars 3 and 4 respectively. This main frame carries a main axle 5 to which is rigidly attached the supporting wheels 6.

The opposite ends of the cross bars 4 projects slightly beyond the side bars 2 and are embraced by a substantially U-shaped bearing plate 7, the outer U-shaped end of each of which is spaced from the ends of the bars 4 to provide a guide way for the reception of a slidable feed bar 8 which is provided with an opening 9 that extends through it, the opening in this instance being sufficiently large to receive seed potatoes.

Each bearing plate 7 has mounted thereon a suitable feed hopper 10 that is provided with a discharge opening 11 which communicates, normally, with the opening 9 in the feed bar 8. Each bearing plate 7 also has attached to its under side a discharge pipe 12 arranged in rear and out of vertical alinement with the feed hopper.

A driven shaft 13 is mounted transversely of the main frame and between the axle 5 and the discharge pipes 12, and carries a sprocket 14 which is connected to the axle 5 through the medium of a sprocket 15 and sprocket chains 16. The hub of the sprocket 15 is provided with ratchet teeth that are adapted to coöperate with the ratchet teeth on a sliding collar 17. This collar 17 is normally held in engagement with the hub of the sprocket wheel 15 through the medium of an expansion spring 18. A ratchet lever 19 is mounted upon one of the cross bars 3 and engages the collar 17 and serves as a means whereby the collar 17 which is feathered to the axle 5, may be moved into and out of engagement with the loosely mounted sprocket 15.

The opposite ends of the shaft 13 are provided with actuating disks 20, each of which is provided circumferentially on its outer face with a plurality of laterally projecting studs 21, each of which is detachably connected to the disk by a screw threaded end 22 or in any other suitable manner, as clearly shown in Fig. 5.

The reference numeral 23 represents a lever that is pivoted intermediate its ends as indicated by the numeral 24, one being arranged adjacent each actuating disk. The lower end of each lever projects into the path of movement of the studs 21 so that as each disk rotates the levers 24 will be successively actuated by the studs coming into contact with them. The upper end of each lever 23 is connected to the adjacent feed bar 8 by an L-shaped arm 25. The upper end of each lever 23 is also connected by a retractile spring 26 to a turn buckle 27 which is connected to the adjacent bearing plate 7 whereby the tension of the spring may be varied. As each disk 20 rotates, the studs carried by it will come into contact with the lever 23 and rock the same upon its pivot to move the feed bar rearwardly so that the opening in the latter will register with the discharge pipe 12. As each stud moves out of engagement with each lever 23, the retractile springs 26 will cause the levers 23 to swing on their pivot points and move the feed bars back into their normal position so that the openings 9 in the latter will register with the discharge openings 11 of the feed hopper.

The main frame 1 is provided adjacent its forward end with a bar of downwardly extending L-shaped bracket arms 28. The reference numeral 29 represents a pair of plow standards to each of which is connected a suitable plow point 30. Each plow standard 29 is provided with an upwardly extending arm 31 which is pivotally connected as at 32 to the outer end of each L-shaped bracket 28. The plow standards 29 are connected by a transversely extending rod 23 so that both of them may be actuated or raised and lowered in unison.

In order to raise and lower these plow standards, I provide a bell crank lever 34 pivotally mounted as at 35 upon the main frame, and which has one of its arms connected by a rod 36 to a ratchet lever 37 mounted upon the main frame, while the other arm of the bell crank lever is pivotally connected to the rod 33 by a link 38. Each plow standard 29 is provided with a rearwardly projecting furrow coverer 39. Each furrow coverer consists of a rearwardly projecting arm having an arcuately curved portion 40 extending around the lower end of the adjacent discharge pipe 12. Since each of the furrow coverers 39 is rigidly attached to each standard 29, it will be apparent that when each standard is raised or lowered, that the furrow coverers will also be raised and lowered correspondingly. By raising and lowering the standards 29 and their respective plow points 30, the cutting depth of each plow may be regulated at will.

The main frame is provided with a suitable tongue 41 which carries a double tree 42 connected to the rod 33 by stay chains 43. The rear end of the main supporting frame is provided with a suitable seat 44 positioned within easy reach of the ratchet levers 19 and 37.

By reference to Fig. 1 it will be manifest that the planter is provided with a feed bar having an opening therein of sufficient size for the reception of seed potatoes so that the same can be successively dropped and planted upon each actuation of the feed bar. Should it be desired to use the planter to plant corn the feed bars 8 can be removed and other feed bars substituted such as shown in Fig. 6 wherein it will be seen that the feed bar 8 is provided with a reduced opening 45. It is also to be of course understood that the planter may be used for planting various other kinds of seed by varying the size of the openings in the feed bars 8 and the distance between the seed hills in the ground may be controlled by either adding to and subtracting from the number of laterally projecting studs of the actuating disks 20.

I claim:—

1. The combination with a frame, of a slide member mounted thereon, a driving shaft journaled in said frame, a disk upon said shaft provided with a plurality of spaced laterally projecting studs, a lever pivotally mounted intermediate of its ends upon said frame and having its lower end projecting into the path of said studs, an angle bar pivotally mounted at one end upon said slide member and pivoted at its opposite end to the upper portion of said lever, and means to reciprocate said slide.

2. The combination with a frame, of a slide member mounted thereon, a driving shaft journaled in said frame, a disk upon said shaft provided with a plurality of spaced laterally projecting studs, a lever pivotally mounted intermediate of its ends upon said frame and having its lower end projecting into the path of said studs, an angle bar pivotally mounted at one end upon said slide member and pivoted at its opposite end to the upper portion of said lever, a retractile spring extending from the free end of said lever to a fixed support, and means for adjusting the tension of said spring.

In testimony whereof I have signed my name to this specification in the presence of two subscribing witnesses.

JOHN R. MULLIN.

Witnesses:
W. M. ARTHUR,
RONALD MULLIN.

Copies of this patent may be obtained for five cents each, by addressing the "Commissioner of Patents, Washington, D. C."